G. F. RAUCH.
BEER AND HOPS SEPARATOR.
APPLICATION FILED OCT. 6, 1913.
1,092,538.
Patented Apr. 7, 1914.
3 SHEETS—SHEET 1.
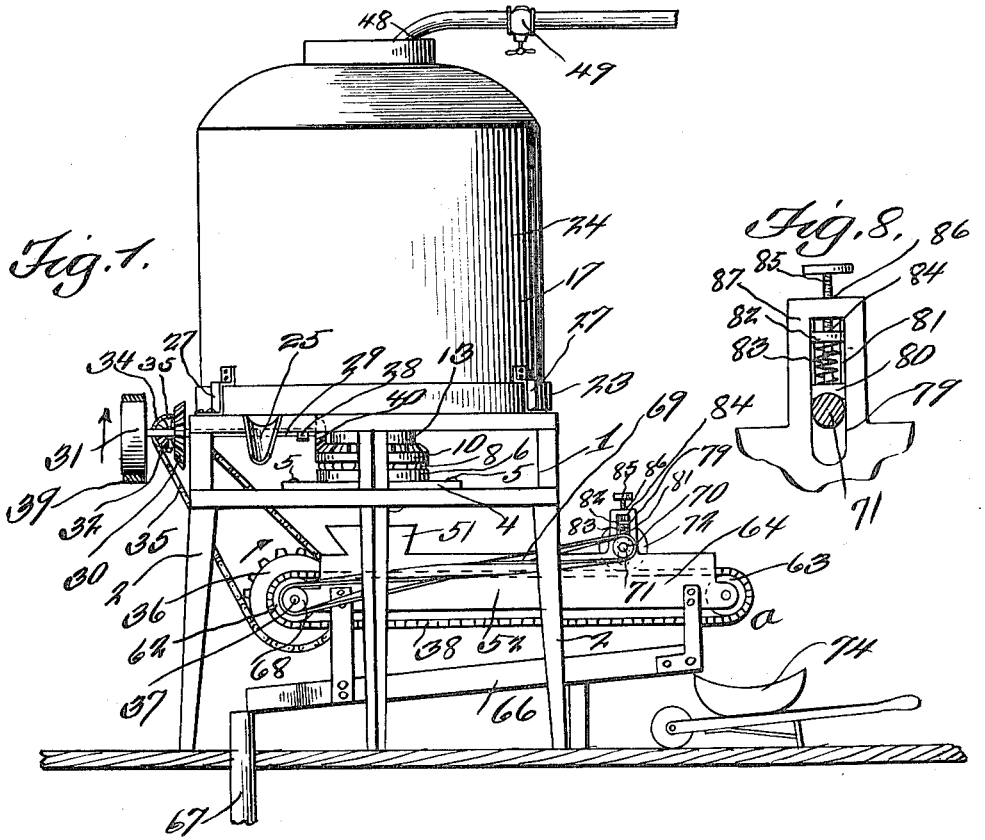
Witnesses
Mark DeGrange
Francis T. Boswell
Inventor
G. F. Rauch,
By D. Swift &C.,
his Attorneys

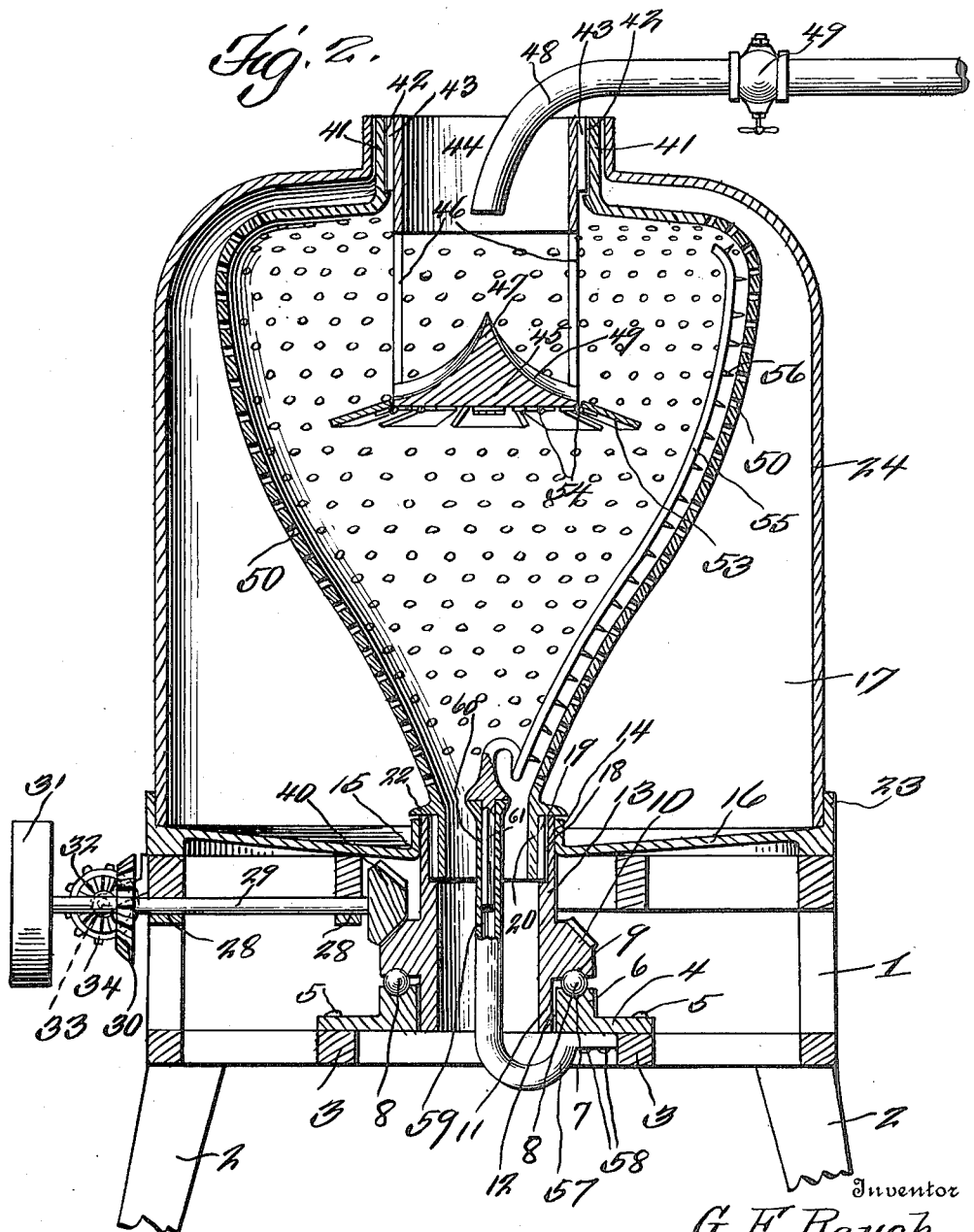

G. F. RAUCH.
BEER AND HOPS SEPARATOR.
APPLICATION FILED OCT. 6, 1913.
1,092,538.
Patented Apr. 7, 1914.
3 SHEETS—SHEET 3.
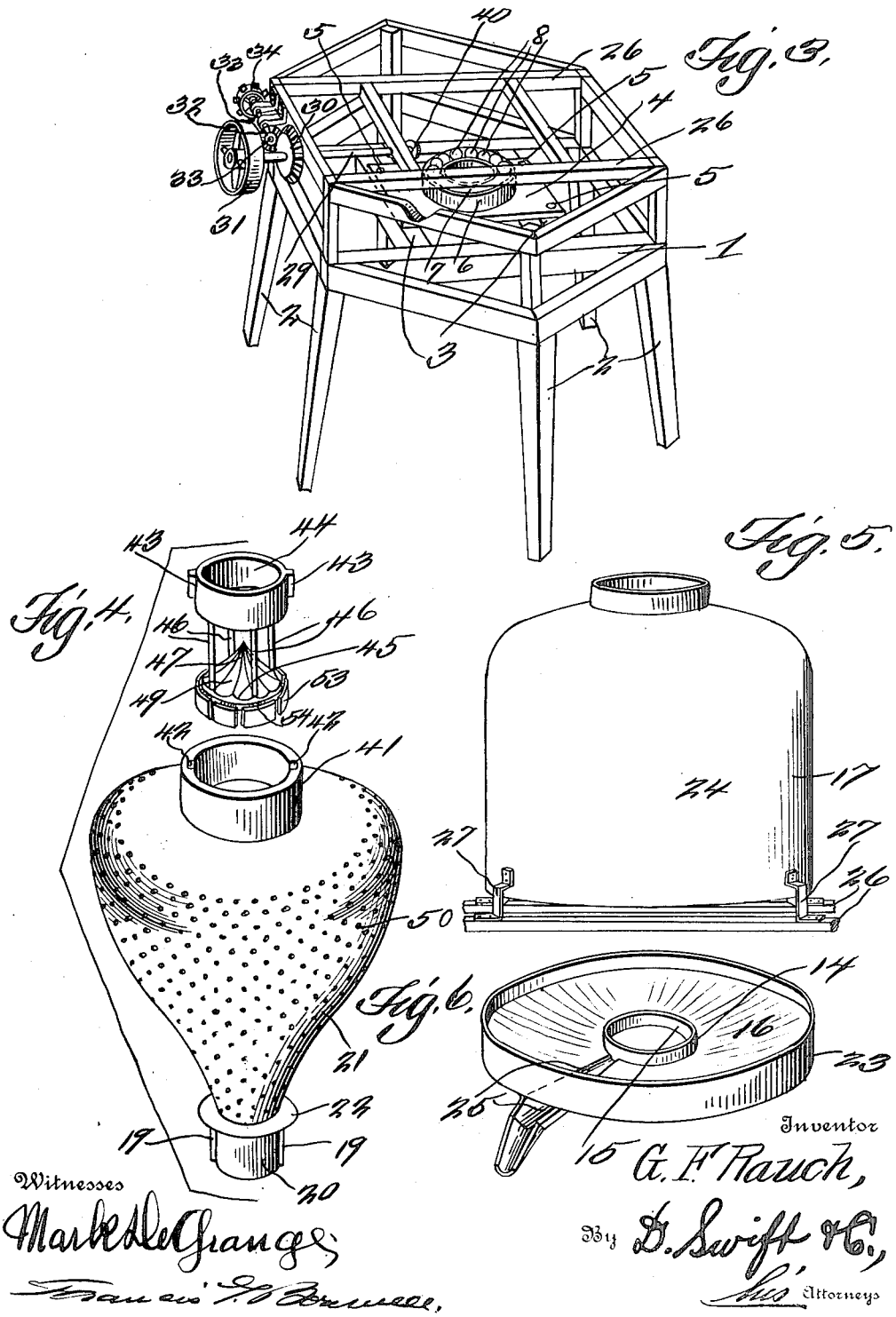

UNITED STATES PATENT OFFICE.

GEORGE F. RAUCH, OF PLATTE, SOUTH DAKOTA.

BEER AND HOPS SEPARATOR.

1,092,538.      Specification of Letters Patent.      Patented Apr. 7, 1914.

Application filed October 6, 1913. Serial No. 793,690.

*To all whom it may concern:*

Be it known that I, GEORGE F. RAUCH, a citizen of the United States, residing at Platte, in the county of Charles Mix and State of South Dakota, have invented a new and useful Beer and Hops Separator; and I do hereby declare the following to be a full, clear, and exact description of the invention, such as will enable others skilled in the art to which it appertains to make and use the same.

This invention relates to the art of brewing, and particularly to a new and useful separator, for separating the beer and hops.

One of the features of the invention is the provision of a receptacle in which a revoluble pear-shaped screen is mounted, having a distributer or splasher for swirling or splashing the fluid or combination of beer and hops against the inner circumference of the pear-shaped screen.

Another feature of the invention is the provision of a plurality of agitator wings carried by the distributer or splasher, which wings owing to the centrifugal force swing outwardly, so as to splash the fluid or combination of hops and beer against the inner circumference of the pear shaped revoluble screen, the beer passing through the perforations of the screen, while the hops pass centrally down through the screen.

Another feature of the invention is the provision of a stationary supported rake or comb conforming to the contour of the pear-shaped or conical screen, to prevent the hops from adhering or clinging to the inner circumference of the pear-shaped screen. In other words, the hops that may hang to the inner surface of the screen are raked or combed off as the screen revolves.

The beer that percolates through the perforations of the pear-shaped screen deposits in the receptacle surrounding the screen, and is carried off by a spout. The hops pass centrally down through the screen.

Another feature of the invention is the provision of a conveyer disposed beneath the outlet of the screen to receive the hops, which are conveyed to and under a yieldably mounted pressure roller, so as to squeeze any further beer that may remain with the hops as they leave the screen. The beer that is pressed from the hops strains between the slots of the conveyer, and into a trough beneath the conveyer, from which it passes into a conduit, or any suitable receptacle. The hops as they leave the pressure roller are conveyed to any suitable form of receptacle, possibly such as a wheel-barrow or the like, which may be used for removing the hops.

Another feature of the invention is the provision of means, such as guides or the like having yieldable ends for conveying the hops to the central portion of the pressure roller.

Another feature of the invention is the provision of means for regulating the yieldable pressure of the roller.

In practical fields the details of construction may necessitate alterations, to which the pantentee is entitled, provided the alterations fall within the scope of what is claimed.

The invention comprises further features and combination of parts, as hereinafter set forth, shown in the drawings and claimed.

In the drawings:—Figure 1 is a view in elevation showing a separator constructed in accordance with the invention. Fig. 2 is a vertical sectional view through the receptacle, showing the pear-shaped screen, the distributer, and the means for operating the screen. Fig. 3 is a perspective view of the frame which supports the receptacle and the screen, and under which the conveyer is arranged. Fig. 4 is a perspective view of the screen and the distributer showing them separated. Fig. 5 is a perspective view of the dome of the receptacle. Fig. 6 is a perspective view of the bottom of the receptacle. Fig. 7 is a detail view showing how the spindle of the pressure roller is yieldably mounted, and how the yieldability can be regulated.

Referring more particularly to the drawings, 1 designates the supporting frame of the apparatus constructed of an angular contour and having legs 2. Upon the beams or cross bars 3 of the frame a plate 4 is secured at 5. This plate is constructed with an annular raised portion 6 having a raceway 7, in which ball bearings 8 are arranged. These ball bearings also operate in the race-way 9 of the beveled gear 10, which is provided with a downwardly extending flange 11 extending into the opening 12 of the plate 4. The beveled gear 10 is constructed with an upwardly extending flange 13 fitting within the flange 14 surrounding the opening 15 of the bottom 16 of the receptacle 17. The flanges 11 and 13 form a tubular member, and upon the inner circumference thereof adjace t its upper end are two oppositely arranged key-ways 18, to receive the oppositely arranged keys 19 of the lower contracted end 20 of the pear-shaped screen 21, so that as the beveled gear 10 rotates, the pear-shaped screen will rotate with it. The contracted lower end of the screen is constructed with an annular flange 22 resting upon the upper end of the flange 13 to support the screen. The outer peripheral portion of the bottom 16 is constructed with an annular flange 23, upon the inner surface of which the dome 24 forming the receptacle 17 engages, which dome surrounds the pear-shaped screen. The bottom 16 inclines toward the center, so that the beer will tend to settle around the center of the bottom, so as to find its way to the spout 25, from which it passes into any suitable receptacle (not shown). The bottom 16 rests upon the frame 1, as shown in Figs. 1 and 2 clearly, while the dome 24 is secured to the bars or beams 26 of the frame 1 by the angular brackets 27.

Mounted in bearings 28 of the frame 1 is a shaft 29 having a beveled gear 30 and a pulley 31. The beveled gear 30 meshes with the beveled pinion 32 of the shaft 33, on which a sprocket 34 is rotatable. Passing about the sprocket 34 is a chain 35, which in turn passes about a sprocket 36 of the shaft 37 of the conveyer 38, the construction and purpose of which will hereinafter appear. Any suitable means (not shown) may be belted to the pulley 31 by means of the belt 39, so that power may be transmitted to the shaft 29 and to the conveyer. Mounted upon one end of the shaft 29, so as to rotate therewith is a beveled pinion 40, meshing with the teeth of the beveled gear 10, and as the shaft 29 is rotated, motion will be imparted to the gear 10, which in turn will operate the pear-shaped screen in a revoluble manner.

The upper annular flange 41 of the pear-shaped screen is constructed with key-ways 42 to receive the keys 43 of the annular sleeve 44 of the distributer 45. This sleeve 44 owing to the keys and key-ways rotates with the pear-shaped screen, and owing to the rod 46, the distributer 45 rotates with the sleeve and the screen. This distributer is constructed with a conical shaped portion 44 extending upwardly, the apex of which is arranged axially with the center of the sleeve 44 and the center of the inflow pipe 48, which is provided with the usual valve 49. The conical portion 47 of the distributer is constructed with grooves 49 extending downwardly and outwardly, and by reason of these grooves and by reason of the fact that the apex of the distributer is arranged axially with the center of the inflow pipe, the fluid or combination of hops and beer will be thoroughly splashed or distributed centrifugally outwardly upon the inner circumference of the pear-shaped screen, with sufficient force so that the beer will strain through the perforations 50 and into the receptacle. The hops will pass from the screen down through the tubular or flange portions of the gear 10 through the hopper 51 of the frame 52 of the conveyer, and upon the conveyer belt 38, where they are further treated, as will be hereinafter set forth. To further assist in agitating and splashing or throwing the fluid centrifugally outwardly, the distributer is provided with a series of wings 53 hinged at 54. These wings when the screen is revolving swing outwardly and upwardly owing to the centrifugal force, so as to direct the fluid toward and upon the inner surface of the pear-shaped screen.

In order to remove any of the hops that may adhere or cling to the inner circumference of the screen a rod 55 having teeth 56 thereby constituting a comb or rake is arranged upon the interior of the screen and adjacent its inner circumference, the rake rod or bar 55 is of a shape conforming to the contour of the screen. In this manner the hops that may adhere to the inner circumference are thoroughly removed, combed or raked off. It will be seen that the comb or rake does not rotate with the screen, but stands immovable or stationary in so far as rotation is concerned, while the screen revolves, and while revolving the hops that may adhere are scraped or raked off. To support the comb or rake in the position shown in Fig. 2 a bracket arm 57 is secured at 58 to the plate 4. This bracket arm curves downwardly and upwardly and terminates in a hollow extension 59 arranged centrally in the tubular or flanged portions of the gear 10. The tubular extension 59 is constructed with a socket 60 rectangular in cross section to receive the stem 61 (which is correspondingly-shaped) of the rake or comb, so as to properly support the same.

As before stated, the hops pass downwardly through the tubular portion of the gear 10 and through the hopper 51, upon the conveyer 38. This conveyer passes about the rollers or drums 62 and 63, mounted in suitable bearings of the sides 64 of the conveyer frame 52. The conveyer 38 is constructed of a series of slats 65 and in any suitable manner (not shown). However, the slats are spaced apart from one another but a trifle, so that any of the beer that may still remain or be retained in the hops may drain or strain through into the trough 66, from which it empties into a suitable conduit or pipe 67, to be conveyed to any suitable location (not shown). The shaft 37 is provided with a pulley 68, about which a belt 69 travels, which belt in turn passes about the pulley 70 on one of the pintles 71 of the roller 72. This roller 72 acts to press or mash the hops against the conveyer belt 38, so as to squeeze as much beer as possible from the hops, as the same passes between the roller and the belt. The hops after being thoroughly pressed or mashed, they deposit from the conveyer at *a* into a receptacle 74, so as to be carried away. To guide the hops toward the center of the roller a pair of deflecting plates 75 having flexible ends 76 are secured at 77 to the inner faces of the sides 64 of the conveyer frame 52. The flexible ends 76 will yield slightly as the hops reach the roller. The pintles of the roller are mounted in guide slots 79 of the sides of the conveyer frame, and bearing upon each pintle, there being only one shown, are blocks 80, guided by the guides 81. Between the blocks 80 and the members 82 are springs 83, and adapted to be swivelly connected in any suitable manner as shown at 84 to the members 82 are the shanks of the adjusting screws 85, which are threaded at 86 in the extensions 87 of the sides 64 of the conveyer frame 52. It will be seen that by adjusting the screws 85 the yieldable pressure of the roller 72 may be increased or decreased.

From the foregoing it will be noted there has been devised a simple and efficient apparatus for separating beer from hops, or separating any like materials, and one which has been found practical.

The invention having been set forth, what is claimed as new and useful is:—

1. In a separator as set forth, a receptacle, a revoluble pear-shaped screen mounted therein, and a distributer device carried in the upper portion of the screen and rotatable therewith, said distributer having a sleeve provided with key connections with the screen, the distributer comprising a conical portion extending upwardly and having its apex arranged axially with the sleeve and axially with an inflow pipe.

2. In a separator as set forth, a receptacle, a revoluble screen mounted therein, a distributer rotatable with the screen and comprising a member having a conical portion extending upwardly, the apex of which being arranged axially with an inflow pipe, said conical portion having a series of grooves extending downwardly and outwardly from the apex, constituting means to impart a swirling motion to the fluid as it is thrown outwardly by the centrifugal force.

3. In a separator as set forth, a receptacle, a revoluble screen mounted therein, a distributer rotatable with the screen and comprising a member having a conical portion extending upwardly, the apex of which being arranged axially with an inflow pipe, said conical portion having a series of grooves extending downwardly and outwardly from the apex, constituting means to impart a swirling motion to the fluid as it is thrown outwardly by the centrifugal force, said member having a series of wings hinged adjacent its outer peripheral edge, adapted to swing outwardly and upwardly as the member revolves.

4. In a separator as set forth, a receptacle, a revoluble pear-shaped screen operable therein, a distributer suspended in the upper end of the screen and rotatable therewith, and a stationary supported comb arranged on the interior of the screen conforming to the contour thereof.

5. In a separator as set forth, a frame, a receptacle supported thereon, a gear having a tubular portion mounted in a bearing of the frame, a frusto-conical pear-shaped screen having keyed connections with the tubular portion of the gear and mounted in the receptacle, a distributer comprising a member having a conical shape extending upwardly, the apex of which being arranged axially with an inflow pipe, a sleeve having keyed connections with the screen and connected to said distributer member, a series of wings hinged to the distributer member adapted to swing outwardly and upwardly to throw the fluid against the inner circumference of the screen, the beer passing through the perforations of the screen, while the hops pass through the tubular portion, means for carrying off the hops, and means for operating the screen.

6. In a separator as set forth, a frame, a receptacle supported thereon, a gear having a tubular portion mounted in a bearing of the frame, a frusto-conical pear-shaped screen having keyed connections with the tubular portion of the gear and mounted in the receptacle, a distributer comprising a member having a conical shape extending upwardly, the apex of which being arranged axially with an inflow pipe, a sleeve having keyed connections with the screen and connected to said splasher member, a series of wings hinged to the distributer member adapted to swing outwardly and upwardly to throw the fluid against the inner circumference of the screen, the beer passing through the perforations of the screen, while the hops pass through the tubular portion, means for carrying off the hops, and means for operating the screen, and means extending into the screen for scraping or raking the hops from the inner circumference so that the same may pass through the tubular portion.

In testimony whereof I have signed my name to this specification in the presence of two subscribing witnesses.

GEORGE F. RAUCH.

Witnesses:
F. M. O'CONNOR,
G. H. FRAZIER.